(12) United States Patent
Muraoka

(10) Patent No.: US 6,317,725 B1
(45) Date of Patent: Nov. 13, 2001

(54) PRODUCTION MANAGEMENT SYSTEM

(75) Inventor: Yukihiro Muraoka, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,855

(22) Filed: Feb. 16, 1999

(30) Foreign Application Priority Data

Feb. 16, 1998 (JP) .................................... 10-032732

(51) Int. Cl.⁷ ............................................. G06F 17/00
(52) U.S. Cl. ............................................. 705/28; 705/7
(58) Field of Search ................... 705/7, 28, 29; 700/96, 99, 100, 101; 707/102, 99, 100

(56) References Cited

U.S. PATENT DOCUMENTS

| | | | |
|---|---|---|---|
| 5,077,661 | * 12/1991 | Jain et al. | 700/99 |
| 5,089,970 | * 2/1992 | Lee et al. | 700/96 |
| 5,128,860 | * 7/1992 | Chapman | 700/99 |
| 5,586,021 | * 12/1996 | Fargher et al. | 700/100 |
| 5,826,236 | * 10/1998 | Narimatsu et al. | 705/8 |
| 6,049,774 | * 4/2000 | Roy | 705/7 |

FOREIGN PATENT DOCUMENTS

| | | |
|---|---|---|
| 5-298280 | 11/1993 | (JP) . |
| 5-314140 | 11/1993 | (JP) . |
| 6-231135 | 8/1994 | (JP) . |
| 7-168881 | 7/1995 | (JP) . |
| 7-210606 | 8/1995 | (JP) . |
| 9-16683 | 1/1997 | (JP) . |
| 9-153088 | 6/1997 | (JP) . |
| 10-31697 | 2/1998 | (JP) . |
| WO 00/02136 | * 1/2000 | (WO) .............................. G06F/15/18 |

OTHER PUBLICATIONS

Using Microsoft Project 4: for Windows (Que, 1994) p. 106.*

* cited by examiner

Primary Examiner—James P. Trammell
Assistant Examiner—John Leonard Young
(74) Attorney, Agent, or Firm—Young & Thompson

(57) ABSTRACT

A method of load partitioning production management includes the steps of partitioning loads on production management in view of at least two predetermined management spans; and carrying out at least any one of planning, executing, correcting and managing of at least one production schedule.

26 Claims, 15 Drawing Sheets

FIG. 1  prior art

Standard Production Schedule

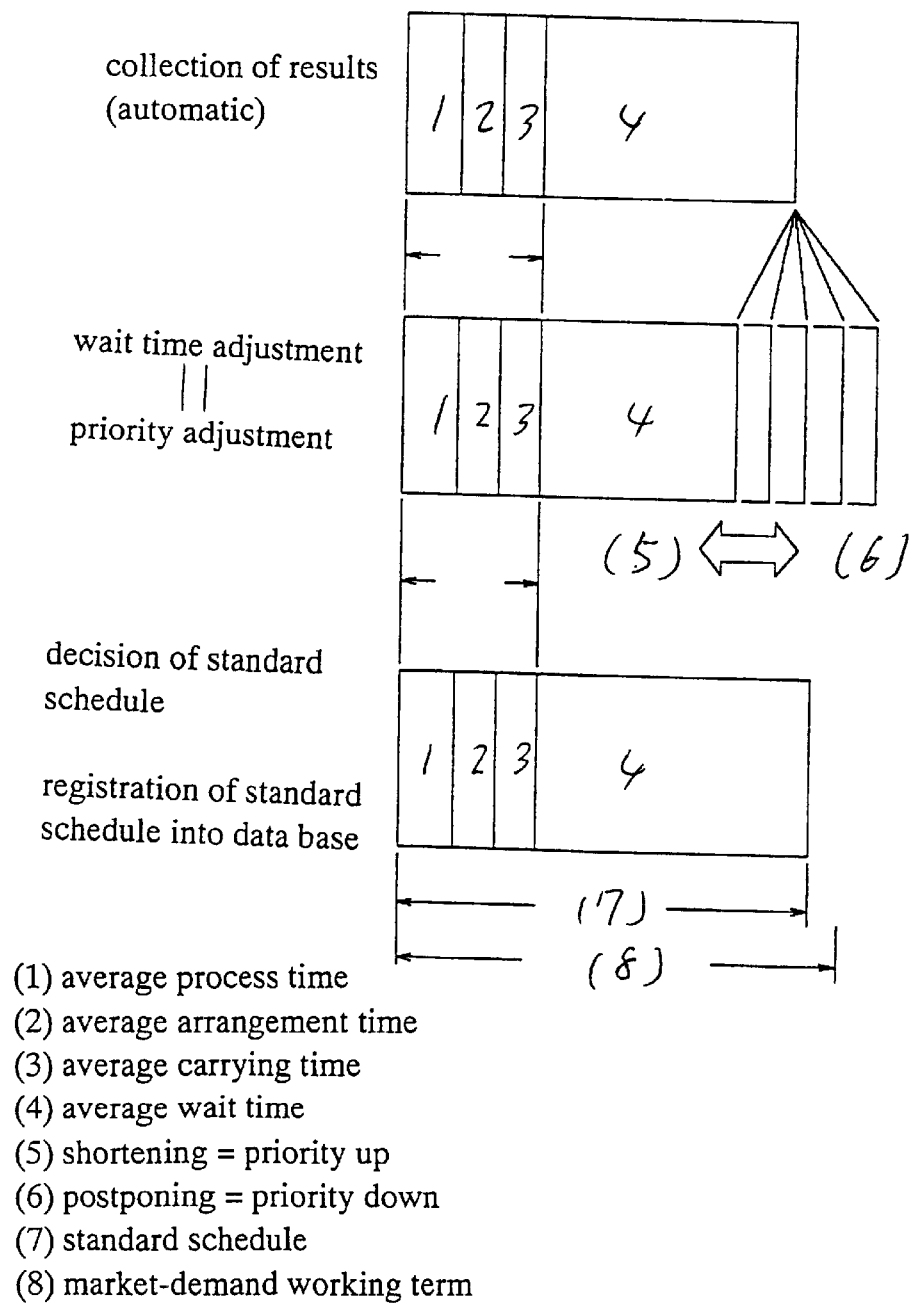

collection of results (automatic)

wait time adjustment || priority adjustment decision of standard schedule registration of standard schedule into data base (1) average process time
(2) average arrangement time
(3) average carrying time
(4) average wait time
(5) shortening = priority up
(6) postponing = priority down
(7) standard schedule
(8) market-demand working term original draft production schedule in acordance with client's order (1) standard schedule   (2) start   (3) complete Load summation calculation for each equipment or group corrected draft production schedule Load summation calculation for each equipment or group

FIG. 8

Lot No. 1.

| (1) | 1 | 2 | 3 | | 2 5 0 |
|---|---|---|---|---|---|
| (2) | A | C | D | | Z |
| (3) | 1 | 4 | 3 | | 2 |
| (4) | 7/1 | 7/1 | 7/2 | 7/2 | 7/25 |

Lot No. 2

| (1) | 1 | 2 | 3 | | 3 0 0 |
|---|---|---|---|---|---|
| (2) | A | B | C | | Z |
| (3) | 1 | 2 | 8 | | 1 |
| (4) | 7/2 | 7/2 | 7/2 | 7/3 | 7/26 |

Lot No. 3

(1) process   (2) equipment   (3) load   (4) complete date (1) last month   (2) this month   (3) next month ○: the date of starting the production
●: the date of completion of the production

FIG. 10 monthly basis load calculation (1977 )

| (4) | (5) | | | | | | (6) | | | | | (7) | (8) | (9) |
|---|---|---|---|---|---|---|---|---|---|---|---|---|---|---|
| ① | A | (10) | 1 | 2 | | | 31 | | | | | 214 | 31 | 6.9 |
| | | (11) | 7 | 8 | | | 5 | | | | | 69 | 31 | 2.2 |
| | | (12) | 1 | 1 | | | 2 | | | | | | 31 | |
| | N | (12) | 8 | 9 | | | 7 | | | | | 283 | 31 | 9.1 |
| | A | (10) | 6 | 7 | | | 8 | | | | | 160 | 26 | 6.2 |
| | | (11) | 15 | 16 | | | 16 | | | | | 490 | 26 | 18.8 |
| | | (12) | 21 | 23 | | | 24 | | | | | 650 | 26 | 25.0 |
| ② | N | (10) | 6 | 5 | | | 6 | | | | | 203 | 27 | 7.5 |
| | | (11) | 2 | 2 | | | 3 | | | | | 71 | 27 | 2.6 |
| | | (12) | 8 | 7 | | | 9 | | | | | 274 | 27 | 10.1 |
| | A | (10) | 7 | * | | | * | | | | | 110 | 17 | 6.5 |
| | | (11) | 17 | * | | | * | | | | | 350 | 17 | 20.5 |
| | | (12) | 24 | * | | | * | | | | | 460 | 17 | 27.0 |
| | N | (10) | 4 | 6 | | | 1 | | | | | 210 | 30 | 7.0 |
| | | (11) | 2 | 1 | | | 3 | | | | | 50 | 30 | 1.7 |
| ③ | | (12) | 6 | 7 | | | 4 | | | | | 260 | 30 | 8.7 |
| | A | (10) | * | * | | | 7 | | | | | 125 | 19 | 6.6 |
| | | (11) | * | * | | | 17 | | | | | 370 | 19 | 19.5 |
| | N | (12) | * | * | | | 24 | | | | | 495 | 19 | 26.1 |

(1) last month  (2) this month  (3) next month  (4) equipment
(5) kind of load  (6) daily load  (7) load subtotal  (8) working days
(9) average load per one day   * holiday

FIG. 11

| (1) | (2) | (3) | (4) | (5) | (6)-1 this month complete load | | | | | (6)-2 next or later month complete load | | | | | |
|---|---|---|---|---|---|---|---|---|---|---|---|---|---|---|---|
| | | | | | (7) equipment "A" | | (8) equipment "B" | | (9) equipment "Z" | (10) before correction | (11) after correction | (12) due date | (13) section | (14) input | (15) stock |
| | | | | | (10) before | (11) after | (10) before | (11) after | (8) | | | | | | |
| 1 | · | 6/20 | 6/20 | | | | | | | | | | | 0 | 0 |
| 4 | · | 6/25 | 6/25 | | | | | | | 7/20 | 7/20 | T | L | 2 | 2 |
| 3 | 1 | 7/1 | 7/1 | | | | 10 | 10 | | 8/4 | 8/4 | T | L | 0 | 0 |
| 2 | 2 | 7/2 | 7/2 | | 1 | 1 | 14 | 14 | | 7/25 | 7/25 | T | T | 1 | 1 |
| 5 | 3 | 7/3 | (7/8) | | | | 5 | 5 | | 7/26 | 7/26 | T | T | 1 | 1 |
| ... | | | | | 1 | 1 | 10 | (8) | | 8/10 | (8/19) | T | N | | |
| n | | | | | | | | | | | | | | | |
| (16) | | | 283 | 274 | 4100 | 4000 | | | | | 460 | 455 | | | |
| (17) | | | 31 | 31 | 31 | 31 | | | | | 17 | 17 | | | |
| (18) | | | 9.1 | 10.1 | 132. | 2129. | | | | | 27.0 | 26.8 | | | |
| (19) | | | 12.0 | 130.0 | 130.0 | | | | | | 26.9 | 26.9 | | | |

(1) priority  (2) Lot No.  (3) start day  (4) before correction  (5) after correction  (6-1) this month complete load  (6-1) next or later month complete load  (7) equipment "A"  (8) equipment "B"  (9) equipment "Z"  (12) due date  (10) before correction  (11) after correction  (13) section  (14) input  (15) stock  (16) total load  (17) working days per one month  (18) average load per one day  (19) throughput per one day  L: last month  T: this month  N: next month (1) next or later month complete target
(2) this month complete target
(3) total target of this month (1) next or later month complete target
(2) this month complete target
(3) total target of this month

PRODUCTION MANAGEMENT SYSTEM

BACKGROUND OF THE INVENTION

The present invention relates to a production management system, and more particularly to a production management system with optimization to schedules for individual stages throughout production schedule planing and actual production management in a production facility to improve a planing reliability with adjustment to loads of individual production facilities as well as planning, management and modification of working performance schedules.

The conventional production management system will be described by taking as an example a standard manufacturing schedule system with reference to FIG. 1 which is a block diagram illustrative of a conventional method of making a conventional standard manufacturing schedule data base.

It will be considered that products and produced in production lines. Actual times taken from a start of the actual production to a completion thereof are collected for a predetermined amount of lots, so that an average processing time (1) per a single lot, an average working preparation time (2) per a single lot, an average carrying time (3) per a single lot and an average waiting time (4) per a single lot are found in a actual time collection step S1.

In consideration of priority, the waiting times are adjusted in a "waiting time adjustment of priority adjustment" step S2, wherein other times than the waiting time are, of course, unchanged and fixed. For example, the waiting times are adjusted in a manner that the priority is risen up to shorten the waiting time whilst the priority is fallen down to postpone the waiting time.

In a "standard manufacturing schedule determination" step S3, a standard manufacturing schedule is so determined that a term of the standard manufacturing schedule is shorter by a margin than a market-demand working term.

In a "standard manufacturing schedule data base registration" step S4, the decided standard manufacturing schedule is registered in a standard manufacturing schedule data base system.

The subsequent descriptions will focus on planning an input schedule and an actual production in production lines with reference to FIG. 2 which is a flow chart illustrative of conventional sequential processes from planing an input schedule through a completion of an actual production in production lines.

In a step S21, a draft production schedule is prepared in accordance with client's orders, wherein the draft production schedule is represented in the form of standard manufacturing schedule bars as illustrated in FIG. 3. There may be omitted the above "standard manufacturing schedule determination" step S3 and the above "standard manufacturing schedule data base registration" step S4.

Referring back to FIG. 2, in a step S22, assuming that the productions are made in accordance with the draft production schedule, load summation calculations are made for each equipment or group for every date. FIG. 4 is a view illustrative of individual loads to individual equipments over dates with reference to individual production capacity possessed by the individual equipments.

In a step S23, there is confirmed whether or not the individual loads to individual equipments over dates are beyond individual production capacity possessed by the individual equipments. If the individual loads remain below the individual production capacity possessed by the individual equipments, then this means it possible to realize the draft production schedule. If, however, the individual loads are made beyond at least any one day the individual production capacity possessed by the individual equipments, then this means it difficult to realize the draft production schedule.

In a step S24, the above original draft production schedule is corrected so as to satisfy the conditions of the client's designated delivery date. FIG. 5 is a view illustrative of a corrected draft production schedule represented in the form of standard manufacturing schedule bars.

The step will be back to the step S22, assuming that the productions are made in accordance with the corrected draft production schedule, load summation calculations are made for each equipment or group for every dates. FIG. 5 is a view illustrative of individual loads to individual equipments over dates with reference to individual production capacity possessed by the individual equipments.

Again in the step S23, there is confirmed whether or not the individual loads to individual equipments over dates are beyond individual production capacity possessed by the individual equipments. If the individual loads remain below the individual production capacity possessed by the individual equipment, then this means it possible to realize the draft production schedule. If, however, the individual loads are made beyond at least any one day the individual production capacity possessed by the individual equipments, then this means it difficult to realize the draft production schedule.

The above looped processes of the steps S22, S23 and S24 will be repeated until all of the individual loads to individual equipments over dates are below the individual production capacity possessed by the individual equipments.

In a step S25, an actual production process will start and in a subsequent step S26, the individual summation loads are set targets for the individual equipments or groups so as to check in a predetermined time span such as one time per one day whether or not the individual targets are achieved by the individual equipments or groups. If the target is not achieved, then in a step S27, a production speed is accelerated to recover the delay and attempt to achieve the target.

The closet prior art to the above conventional production management system is disclosed in Japanese laid-open patent publication No. 6-259436.

The above conventional production management system has the following disadvantages. The conventional production management system is free of any feature of planing the production schedule or the production target together with recognition of an urgently achieved load or target which should be completed within this month from a non-urgently achieved load or target which may be completed by the next mouth or later. Further, the conventional production management system is free of any feature of correcting the production target and accelerating the production speed under management of both the urgent and non-urgent loads or targets. Those raise the following problems.

The conventional system is incapable of recognizing which lot may raise a problem like that since a production of this lot had a low priority in the past, the production of this lot has been discontinued under the priority management even the production should have to be completed within this month. This means that the priority management is necessary condition, but not sufficient condition. Namely, only the priority management is insufficient.

Under the priority management, only high priority lots are processed by taking precedence over the low priority lots whereby the individual loads to the individual equipments may be unbalanced. As a result, the timing of beginning the productions of the lots may be unbalanced.

The problem with unbalance in loads may raise a further serious problem that although all individual targets allocated for the individual equipments or groups are achieved, any of the lots which should have to be completed within this month could not arrive at this month target, resulting in that a monthly production target could not be achieved.

Furthermore, in recent years, the requirement for shortening the production delivery term of the custom products has been on the increase due to market unpredictability.

For the production of the custom products, there is raised a problem in postponing the delivery data of the products from the client's designated data. The production line for this client is stopped. As a result, customer's reliance has been lost and not further order could be received from this client.

The conventional system is, however, incapable of distinguish the urgently achieved load or target which should be achieved within this month from the non-urgently achieved load or target which should be achieved by the next month or later, for which reason the conventional system makes it difficult to investigate the cause of the unachievement and to take countermeasure against the above problem.

Even if the production speed is accelerated and this month target could be achieved, then in the next or later months, the above problems may be raised repeatedly.

In the above circumstances, it had been required to develop a novel production management system free from the above problems.

SUMMARY OF THE INVENTION

Accordingly, it is an object of the present invention to provide a novel production management system free from the above problems.

It is a further object of the present invention to provide a novel production management system capable of planning, correcting and managing a production schedule in a manner that both targets in production amounts and delivery data are surely achieved.

It is a still further object of the present invention to provide a novel production management system capable of distinguishable information to be used in view of individual delivery terms for allowing a person to readily recognize any problems in planning the production schedule and in the production management for effective working performance.

The presence invention provides a method of load partitioning production management. The method comprises the steps of: partitioning loads on production management in view of at least two predetermined management spans; and carrying out at least any one of planning, executing, correcting and managing of at least one production schedule.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 1 is a block diagram illustrative of a conventional method of making a conventional standard manufacturing schedule data base.

FIG. 8 is a view illustrative of a configuration of the production schedule to be used by the novel production management system of FIG. 7 in accordance with the present invention.

FIG. 10 is a diagram illustrative of results of the calculations on the completion-monthly basis calculated by the this-month load calculation section and the future month load calculation section.

FIG. 11 is a diagram illustrative of a result of the compositions of the completion-monthly basis loads over this and next months, wherein "corrected value" columns and "throughput per one day" column are blanked.

DISCLOSURE OF THE INVENTION

Figure 2:
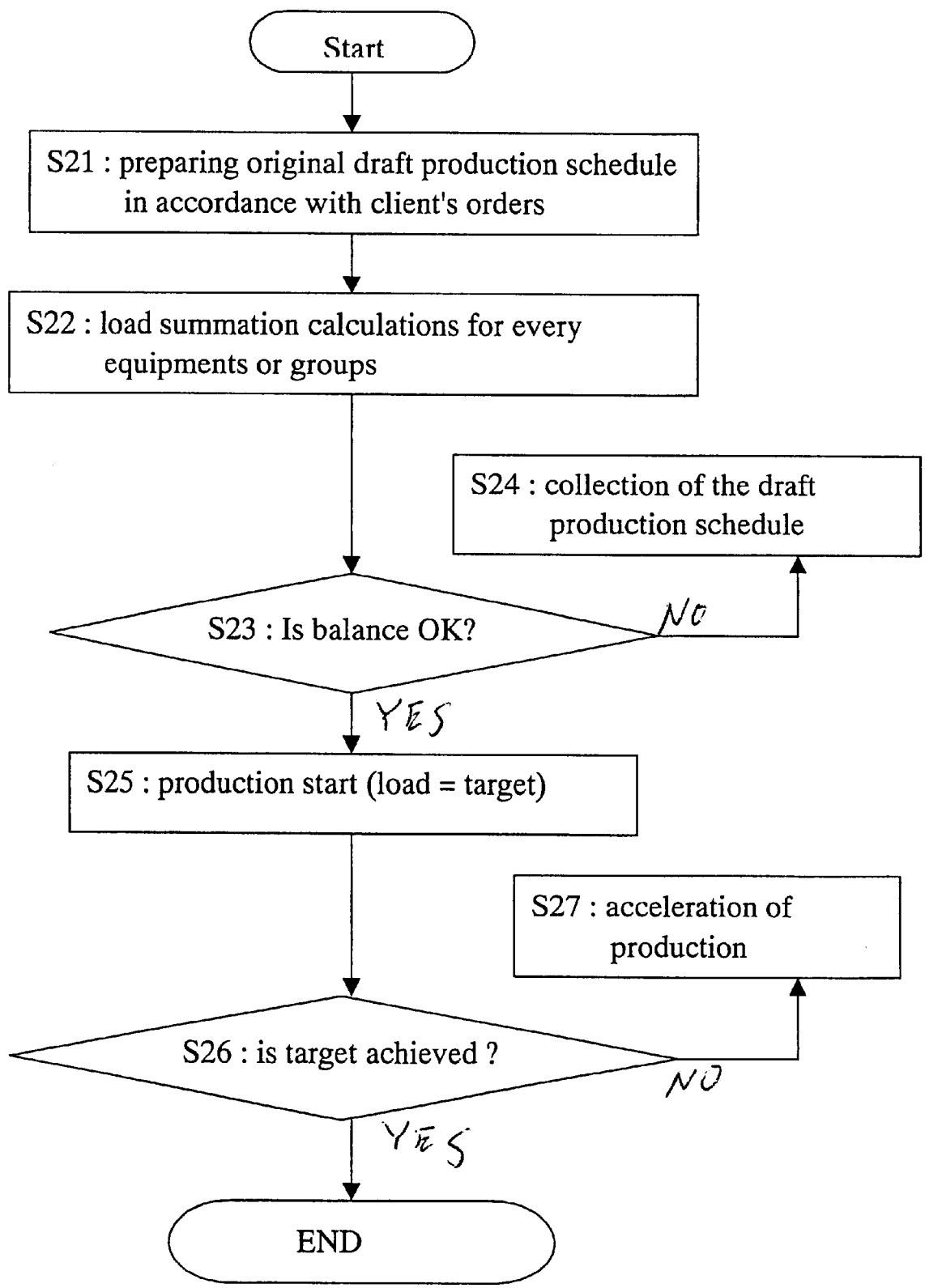
FIG. 2 is a flow chart illustrative of conventional sequential processes from planing an input schedule through a completion of an actual production in production lines.
Figure 3:
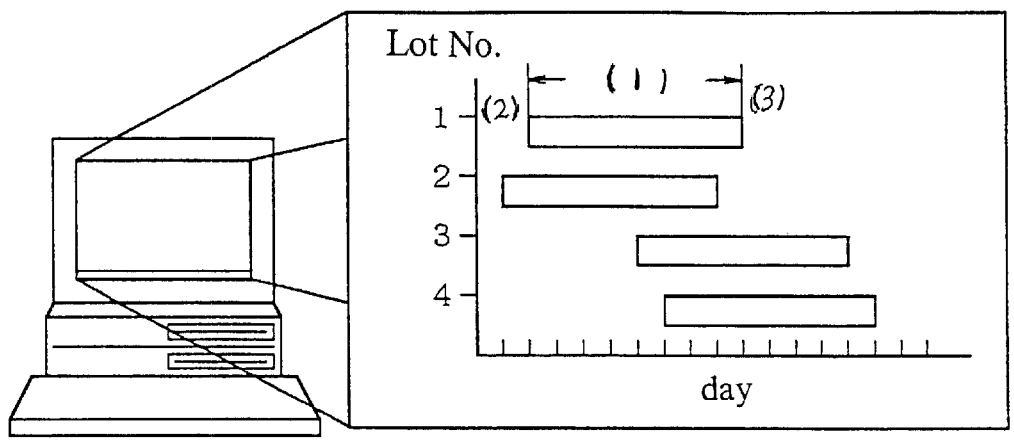
FIG. 3 is a view illustrative of an original draft production schedule represented in the form of standard manufacturing schedule bars.
Figure 4:
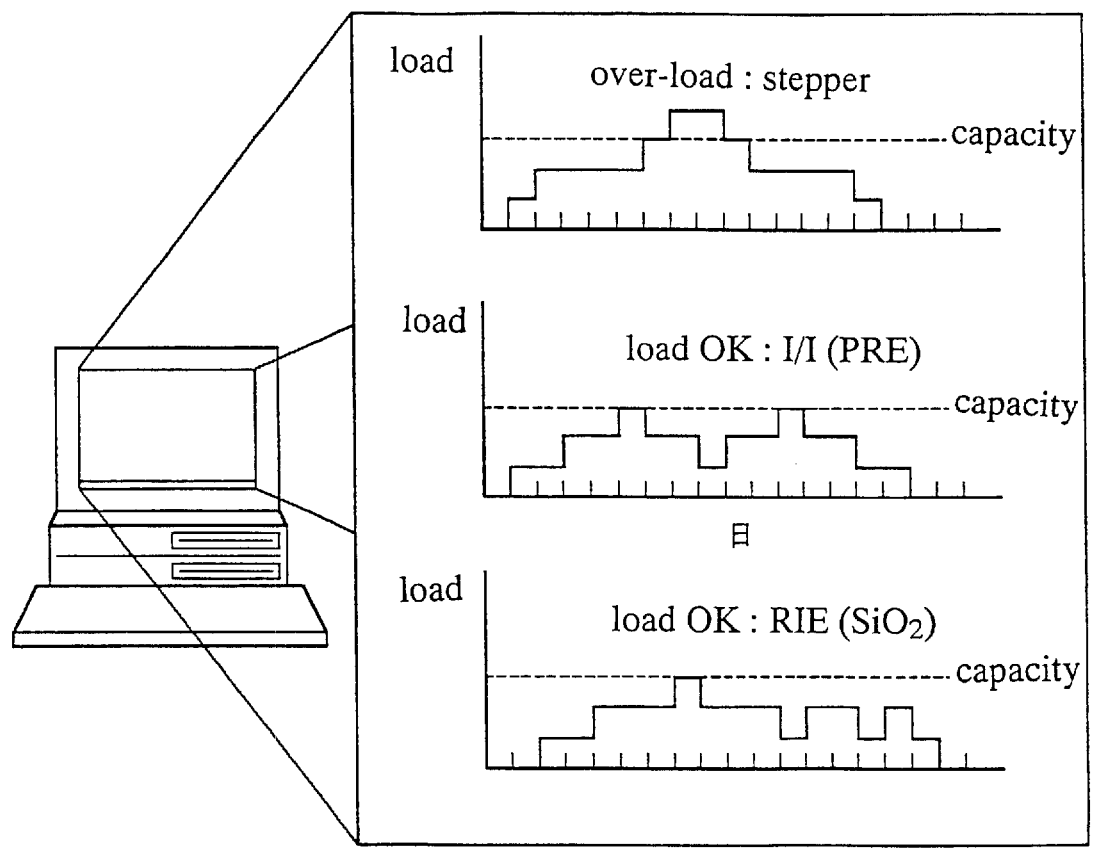
FIG. 4 is a view illustrative of whether or not individual loads to individual equipments over dates are beyond individual production capacity possessed by the individual equipments.
Figure 5:
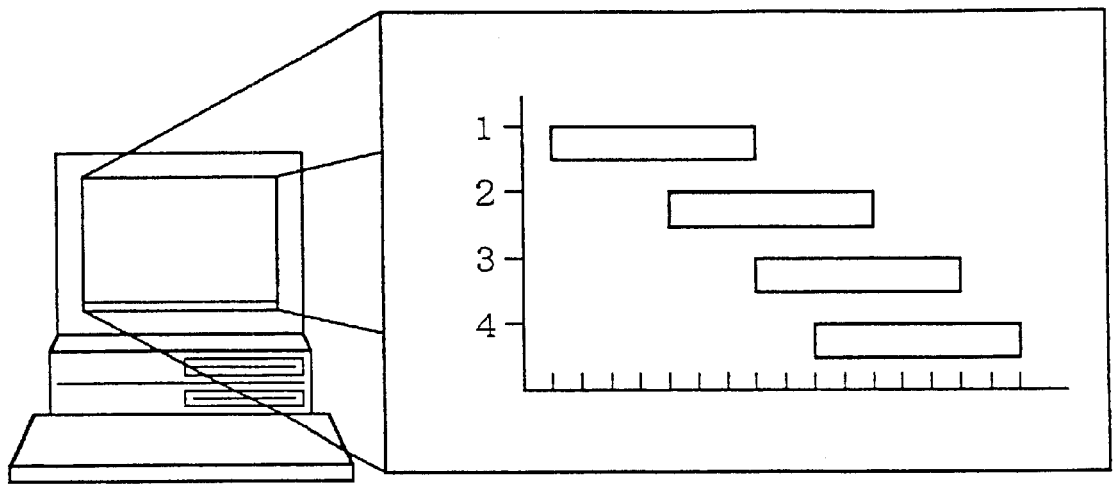
FIG. 5 is a view illustrative of a corrected draft production schedule represented in the form of standard manufacturing schedule bars.
Figure 6:
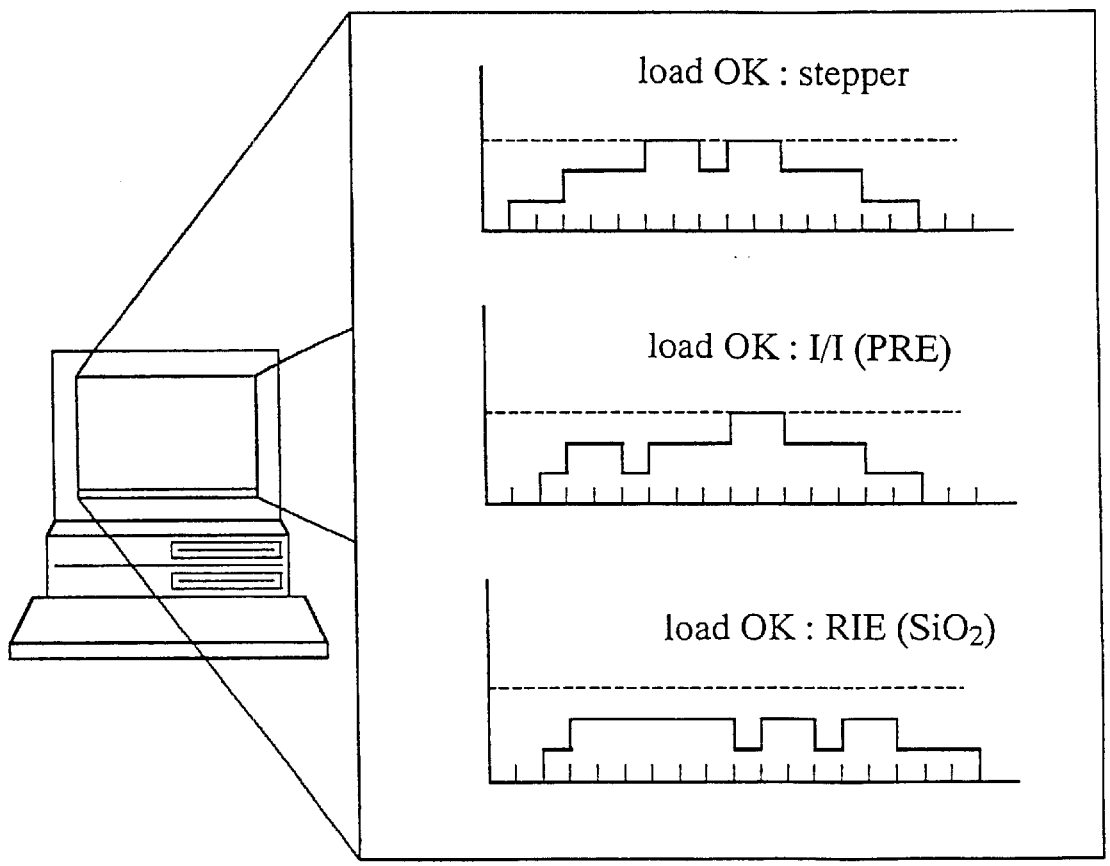
FIG. 6 is a view illustrative of individual loads to individual equipments over dates with reference to individual production capacity possessed by the individual equipments.

The first present invention provides a method of load partitioning production management. The method comprises the steps of: partitioning loads on production management in view of at least two predetermined management spans; and carrying out at least any one of planning, executing, correcting and managing of at least one production schedule.

It is preferable that after the loads are partitioned, individual load calculations are made for the at least two predetermined management spans.

It is also preferable that after the loads are partitioned, individual load balancing checks are made for the at least two predetermined management spans.

It is also preferable that after the loads are partitioned, individual production schedule corrections are made for the at least two predetermined management spans.

It is also preferable that after the loads are partitioned, individual production target indication processes and subsequent production execution and management processes are made for the at least two predetermined management spans.

It is also preferable that after the loads are partitioned, checking achievements of individual production targets is made for the at least two predetermined management spans.

It is also preferable that after the loads are partitioned, correcting individual production targets is made for the at least two predetermined management spans.

The second present invention provides a method of load partitioning production management. The method comprises the steps of: partitioning loads on production management in view of at least two predetermined management spans; and carrying out individual load calculations for the at least two predetermined management spans.

The third present invention provides a method of load partitioning production management. The method comprises the steps of: partitioning loads on production management in view of at least two predetermined management spans; and carrying out individual load balancing checks for the at least two predetermined management spans.

The fourth present invention provides a method of load partitioning production management. The method comprises the steps of: partitioning loads on production management in view of at least two predetermined management spans; and carrying out individual production schedule corrections for the at least two predetermined management spans.

The fifth present invention provides a method of load partitioning production management. The method comprises the steps of: partitioning loads on production management in view of at least two predetermined management spans; and carrying out individual production target indication process and subsequent production execution and management processes for the at least two predetermined management spans.

The sixth present invention provides a method of load partitioning production management. The method comprises the steps of: partitioning loads on production management in view of at least two predetermined management spans; and checking achievements of individual production targets for the at least two predetermined management spans.

The seventh present invention provides a method of load partitioning production management. The method comprises the steps of: partitioning loads on production management in view of at least two predetermined management spans; and correcting individual production targets for the at least two predetermined management spans.

The eighth present invention provides a system for load partitioning production management. The system comprises: a section for partitioning loads on productions management in view of at least two predetermined managements spans; and a section for carrying out at least any one of planning, executing, correcting and managing of at least one production schedule.

It is also preferable that there is provided a section for making individual load calculations for the at least two predetermined management spans after the loads have been partitioned.

It is also preferable that there is provided a section for making individual load balancing checks for the at least two predetermined management spans after the loads have been partitioned.

It is also preferable that there is provided a section for making individual production schedule corrections for the at least two predetermined management spans after the loads have been partitioned.

It is also preferable that there is provided a section for making individual production target indication process and subsequent production execution and management processes for the at least two predetermined management spans after the loads have been partitioned.

It is also preferable that there is provided a section for making checking achievements of individual production targets for the at least two predetermined management spans after the loads have been partitioned.

It is also preferable that there is provided a section for making correcting individual production targets is made for the at least two predetermined management spans after the loads have been partitioned.

The ninth present invention provides a system of load partitioning production management. The system comprises: a section for partitioning loads on production management in view of at least two predetermined management spans; and a section for carrying out individual load calculations for the at least two predetermined management spans.

The tenth present invention provides a system of load partitioning production management. The system comprises: a section for partitioning loads on production management in view of at least two predetermined management spans; and a section for carrying out individual load balancing checks for the at least two predetermined management spans.

The eleventh present invention provides a system of load partitioning production management. The system comprises: a section for partitioning loads on production management in view of at least two predetermined management spans; and a section for carrying out individual production schedule corrections for the at least two predetermined management spans.

The twelfth present invention provides a system of load partitioning production management. The system comprises: a section for partitioning loads on production management in view of at least two predetermined management spans; and a section for carrying out individual production target indication process and subsequent production execution and management processes for the at least two predetermined management spans.

The thirteenth present invention provides a system of load partitioning production management. The system comprises: a section for partitioning loads on production management in view of at least two predetermined management spans; and a section for checking achievements of individual production targets for the at least two predetermined management spans.

The fourteenth present invention provides a system of load partitioning production management. The system comprises: a section for partitioning loads on production management in view of at least two predetermined management spans; and a section for correcting individual production targets for the at least two predetermined management spans.

PREFERRED EMBODIMENTS

FIRST EMBODIMENT

A first embodiment according to the present invention will be described in detail with reference to FIG. 7 which is a bock diagram illustrative of a novel production management system. The novel production management system receives orders from an order management system 1. The novel production management system has a production schedule input section 2 into which a production schedule planned on the basis of the order from the order management system 1 is inputted. The novel production management system also has an individual section load calculation section 3 which calculates individual loads to the individual sections on the basis of the production schedule inputted into the production schedule input section 2. The novel production management system also has a load balancing check section 4 for comparing individual production capacities with the individual loads so that if there is any load over the production capacity then the load balancing check section 4 sends an instruction to correct the production schedule for balancing the loads over the individual equipments or groups. The novel production management system also has a production capacity memory 5 for storing individual production capacities possessed by the individual equipments or groups for allowing the load balancing check section 4 to refer the individual production capacities for the above comparison process between the individual loads and the individual production capacities. The novel production management system also has a production schedule correction section 6 for correcting the production schedule in accordance with the instruction from the load balancing check section 4. The corrected production schedule is sent to the individual section load calculation section 3 for subsequent calculation of the individual loads to the individual sections on the basis of the corrected production schedule sent from the production schedule correction section 6, prior to comparison of the individual production capacities with the calculated individual loads. The novel production management system also has an individual target indication section 7 for indicating the individual loads as the targets to the individual production lines for all sections only when all of the individual loads are below the individual production capacities of the individual equipments or groups. The novel production management system also has an individual target achievement checking section 8 for comparing the individual actual production results of the lines to the individual targets for checking whether or not the individual targets are achieved. The novel production management system also has a production result data collection and storage section 9 for collecting data about the actual production results of the individual lines and storing the data therein, so as to allow the individual target achievement checking section 8 to compare the individual actual production results of the lines to the individual targets for checking whether or not the individual targets are achieved. The novel production management system also has an allowable production result range storage section 10 for storing individual allowable production results ranges for every sections, so as to allow the individual target achievement checking section 8 to compare the individual actual production results of the lines to the individual targets for checking whether or not the individual targets are achieved. The novel production managements system also has an individual correction target calculation section 11 for calculating corrected targets for all sections only when any of the production results is beyond the individual allowable production result ranges, whereby the individual correction target calculation section 11 sends the corrected targets to the individual target indication section 7 for the purpose of allowing the individual target achievement checking section 8 to compare the individual actual production results of the lines to the individual corrected targets for checking whether or not the individual corrected targets are achieved.

The above individual section load calculation section 3 further comprises a production schedule partitioning section 3-1 for partitioning the production schedule inputted into the production schedule input section 2 on monthly basis, a this month load calculation section 3-2 for calculating the loads of this month, a future month load calculation section 3-3 for calculating the loads by a predetermined future month, and a composite load indication section 3-4 for calculating the composite values of the this month load to the predetermined future month load.

The orders from the order management system 1 are used by the production schedule input section 2 for planning the production schedule. The production schedule partitioning section 3-1 receives the production schedule for partitioning the production schedule on monthly basis or in view of the completion month by when the production should be completed in accordance with the production schedule. The this-month load calculation section 3-2 calculates the this-month loads which should be completed by this month in accordance with the production schedule. The future month load calculation section 3-3 also calculates the future month loads which should be completed by a predetermined future month, for example, n-th month. The calculated this-month load and the future month load are sent to the composite load indication section 3-4 for allowing the composite load indication section 3-4 to calculate the composite load values of the this month load to the predetermined future month load, before the composite load value is sent to the load balancing check section 4 for referring the individual production capacities stored in the production capacity memory 5 for the purpose of comparing the individual production capacities with the individual composite loads so that if there is any load over the production capacity then the load balancing check section 4 sends an instruction to correct the production schedule for balancing the loads over the individual equipments or groups. The production schedule correction section 6 corrects the production schedule in accordance with the instruction from the load balancing check section 4, before the corrected production schedule is sent to the individual section load calculation section 3 for subsequent calculation of the individual loads to the individual sections on the basis of the corrected production schedule sent from the production schedule correction section 6, prior to comparison of the individual production capacities with the calculated individual loads. If all of the individual loads are below the individual production capacities of the individual equipments or groups, then the individual target indication section 7 indicates the individual loads as the targets to the individual production lines for every sections. The individual target achievement checking section 8 compares the individual actual production results of the lines to the individual targets for checking whether or not the individual targets are achieved. The production results are informed to the production result data collection and storage section 9 for collecting data about the actual production results of the individual lines and storing the data therein, so as to allow the individual target achievement checking section 8 to compare the individual actual production results of the lines to the individual targets for checking whether or not the individual targets are achieved. The allowable production result range storage section 10 storing individual allowable production result ranges for every sections allows the individual target achievement checking section 8 to compare the individual actual production results of the lines to the individual targets for checking whether or not individual targets are achieved. The individual correction target calculation section 11 calculates corrected targets for every sections only when any of the production results is beyond the individual allowable production result ranges, whereby the individual correction target calculation section 11 sends the corrected targets to the individual target indication section 7 for the purpose of allowing the individual target achievement checking section 8 to compare the individual actual production results of the lines to the individual corrected targets for checking whether or not the individual corrected targets are achieved.

It is possible to modify the monthly basis partitioning to other partitioning methods. In this case, the above descriptions of the configurations of the system and sequential processes are applicable.

The above load calculation is made in accordance with the forward unlimited load stack. Notwithstanding, it is possible to calculate the load in accordance with the backward unlimited load stack or in accordance with the simulation load calculation.

Figure 7:
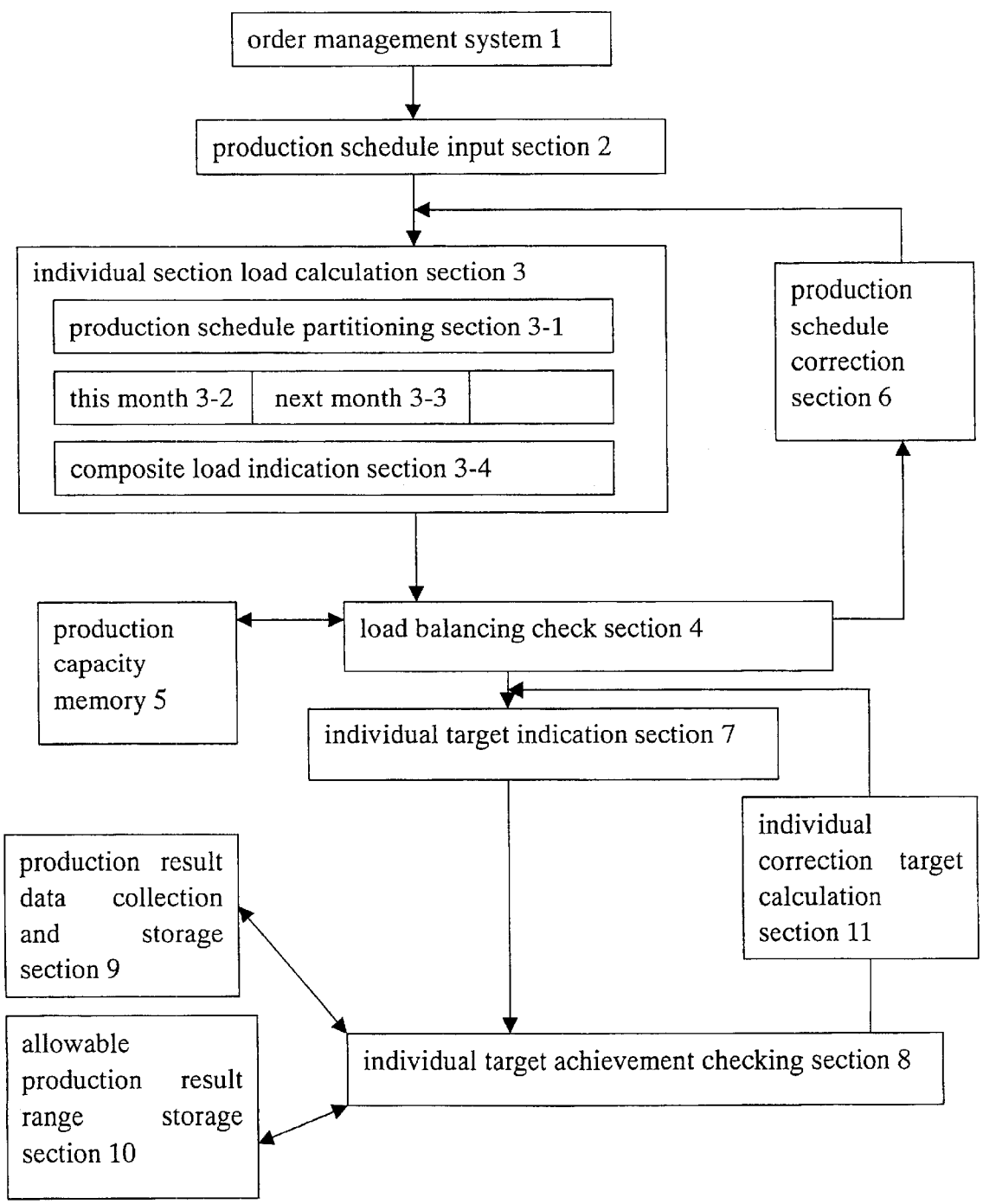
FIG. 7 is a bock diagram illustrative of a novel production management system in a first embodiment in accordance with the present invention.

FIG. 8 is a view illustrative of a configuration of the production schedule to be used by the novel production management system of FIG. 7 in accordance with the present invention. The production schedule comprises a plurality of lots, for example, a lot No. 1 to a lot No. m. Each lot further comprises individual process names, individual equipment names for the individual processes, individual loads to the individual equipments, completion dates by when the productions should be completed, individual priorities and names of individual products. For example, the lot No. 1 will be processed as follows. In the first step, an equipment "A" is used with a load of 1 to complete the production by first day of July. In the second step, an equipment "C" is used with a load of 4 to complete the production by first day of July. In the third step, an equipment "D" is used with a load of 3 to complete the production by second day of July. In the last step or two hundred fiftieth step, an equipment "Z" is used with a load of 2 to complete the production by twenty fifth day of July. The lot No. 1 has a production term to start the production on first day of July and complete the production on twenty fifth day of July.

The lot No. 2 will be processed as follows. In the first step, an equipment "A" is used with a load of 1 to complete the production by second day of July. In the second step, an equipment "B" is used with a load of 2 to complete the production by second day of July. In the third step, an equipment "C" is used with a load of 8 to complete the production by second day of July. In the last step or three hundredth step, an equipment "Z" is used with a load of 1 to complete the production by twenty sixth day of July. The lot No. 1 has a production term to start the production on second day of July and complete the production on twenty sixth day of July, for which reason the lot No. 2 is the same as the lot No. 1 in the production term. The lot No. 2 has more fifty steps from No. 251 to No. 300 than the lot No. 1, whilst the production term of the lot No. 2 is the same as the lot No. 1, for which reason the production speed or the average processes per one day of the lot No. 2 is higher than that of the lot No. 1.

The production schedule inputted into the production schedule input section 2 has the lots Nos. 1 to m. Each lot is given a priority. There are same lots which should be completed by the next or later month. The production schedule data are sent to the individual section load calculation section 3. As described above, this individual section load calculation section 3 further comprises the production schedule partitioning section 3-1 for partitioning the production schedule inputted into the production schedule input section 2 on monthly basis, the this-month load calculation section 3-2 for calculating the loads of this month, the future month load calculation section 3-3 for calculating the loads by a predetermined further month, and the composite load indication section 3-4 for calculating the composite values of the this month load to the predetermined future month load.

Figure 9:
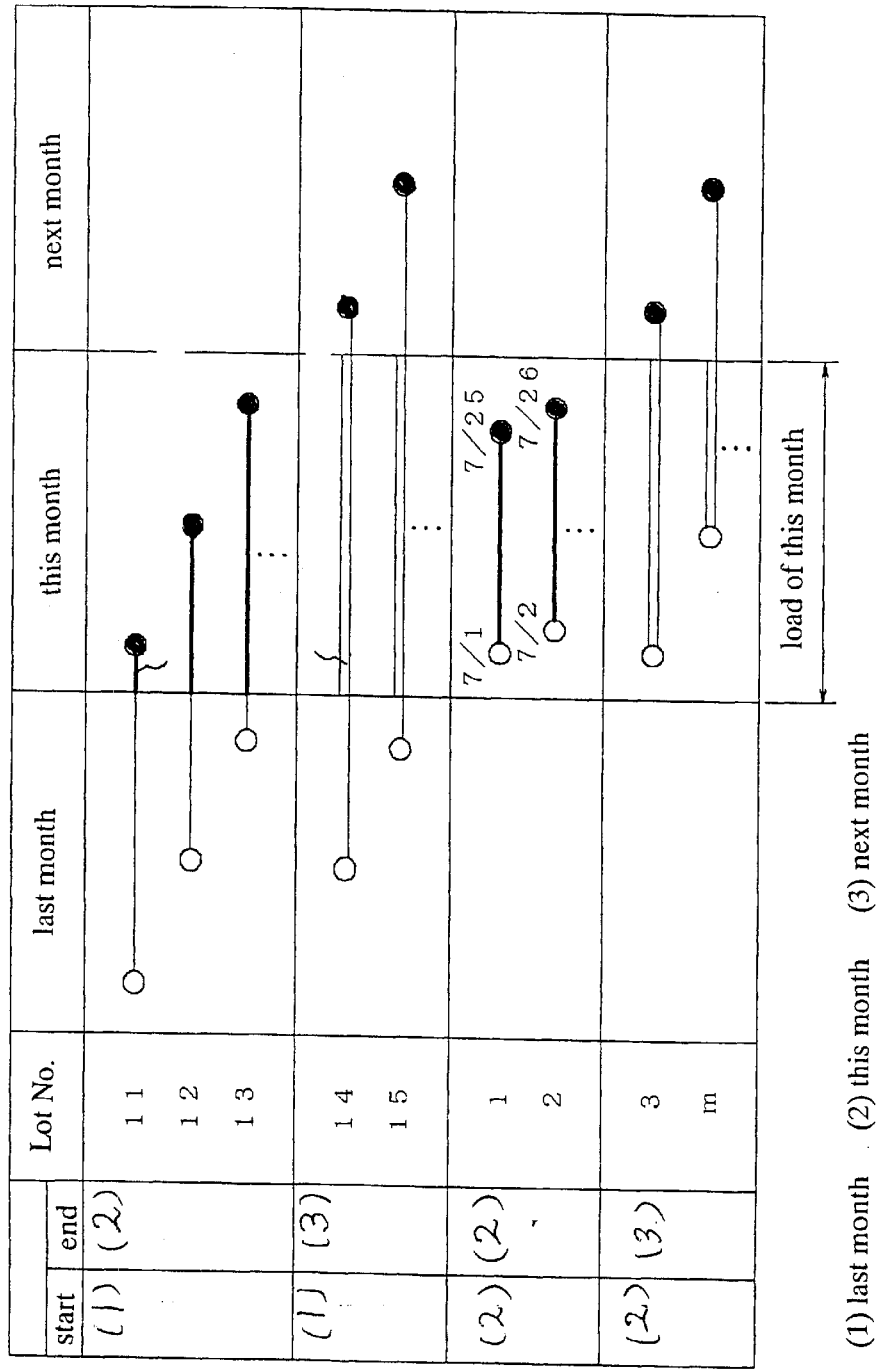
FIG. 9 is a diagram illustrative of the production schedule indicating loads to individual lots in view of this month or July.

FIG. 9 is a diagram illustrative of the production schedule indicating loads to individual lots in view of this month of July. ○ represents the data of starting the production whilst ● represents the date of completion of the production. The production schedule partitioning section 3-1 refers the completion dates represented by ● for partitioning the production schedule for every equipments or groups in view of the completion dates. The this-month load calculation section 3-2 calculates the loads of this month or July. The future month load calculation section 3-3 calculates the loads of the next month or August.

FIG. 10 is a diagram illustrative of results of the calculations on the completion-monthly basis calculated by the this-month load calculation section and the future month load calculation section. Every day subtotals of the loads are calculated for individual equipments and every months subtotals of the loads are also calculated for the individual equipments. The average load per one day is calculated by dividing the very months subtotals of the loads with the number of actually working days.

FIG. 11 is a diagram illustrative of a result of the compositions of the completion-monthly basis loads over this and next months, wherein "corrected value" columns and "throughput per one day" column are blanked. The load balancing check section 4 compares individual production capacities with the individual loads so that if there is any load over the production capacity then the load balancing check section 4 sends an instruction to correct the production schedule for balancing the loads over the individual equipments or groups. The production capacity memory 5 stores individual production capacities possessed by the individual equipments or groups for allowing the load balancing check section 4 to refer the individual production capacities for the above composition process between the individual load and the individual production capacities. The production schedule correction section 6 corrects the production schedule in accordance with the instruction from the load balancing check section 4 so as to, for example, shift the start and complete days of a particular lot for balancing the loads over the lots. The corrected production schedule is sent to the individual section load calculation section 3 for subsequent calculation of the individual loads to the individual sections on the basis of the corrected production schedule sent from the production schedule correction section 6, prior to comparison of the individual production capacities with the calculated individual loads. The individual target indication section 7 indicates the individual loads as the targets to the individual production lines for every sections only when all of the individual loads are below the individual production capacities of the individual equipments or groups. The individual target achievement checking section 8 compares the individual actual production results of the lines to the individual targets for checking whether or not the individual targets are achieved. The production result data collection and storage section 9 collects data about the actual production results of the individual lines and storing the data therein, so as to allow the individual target achievement checking section 8 to compare the individual actual production results of the lines to the individual targets for checking whether or not the individual targets are achieved. The allowable production result range storage section 10 stores individual allowable production result ranges for every sections, so as to allow the individual target achievement checking section 8 to compare the individual actual production results of the lines to the individual targets for checking whether or not the individual targets are achieved. The individual correction target calculation section 11 calculates corrected targets for every sections only when any of the production results is beyond the individual allowable production result ranges, whereby the individual correction target calculation section 11 sends the corrected targets to the individual target indication section 7 for the purpose of allowing the individual target achievement checking section 8 to compare the individual actual production results of the lines to the individual corrected targets for checking whether or not the individual corrected targets are achieved.

Figure 12:
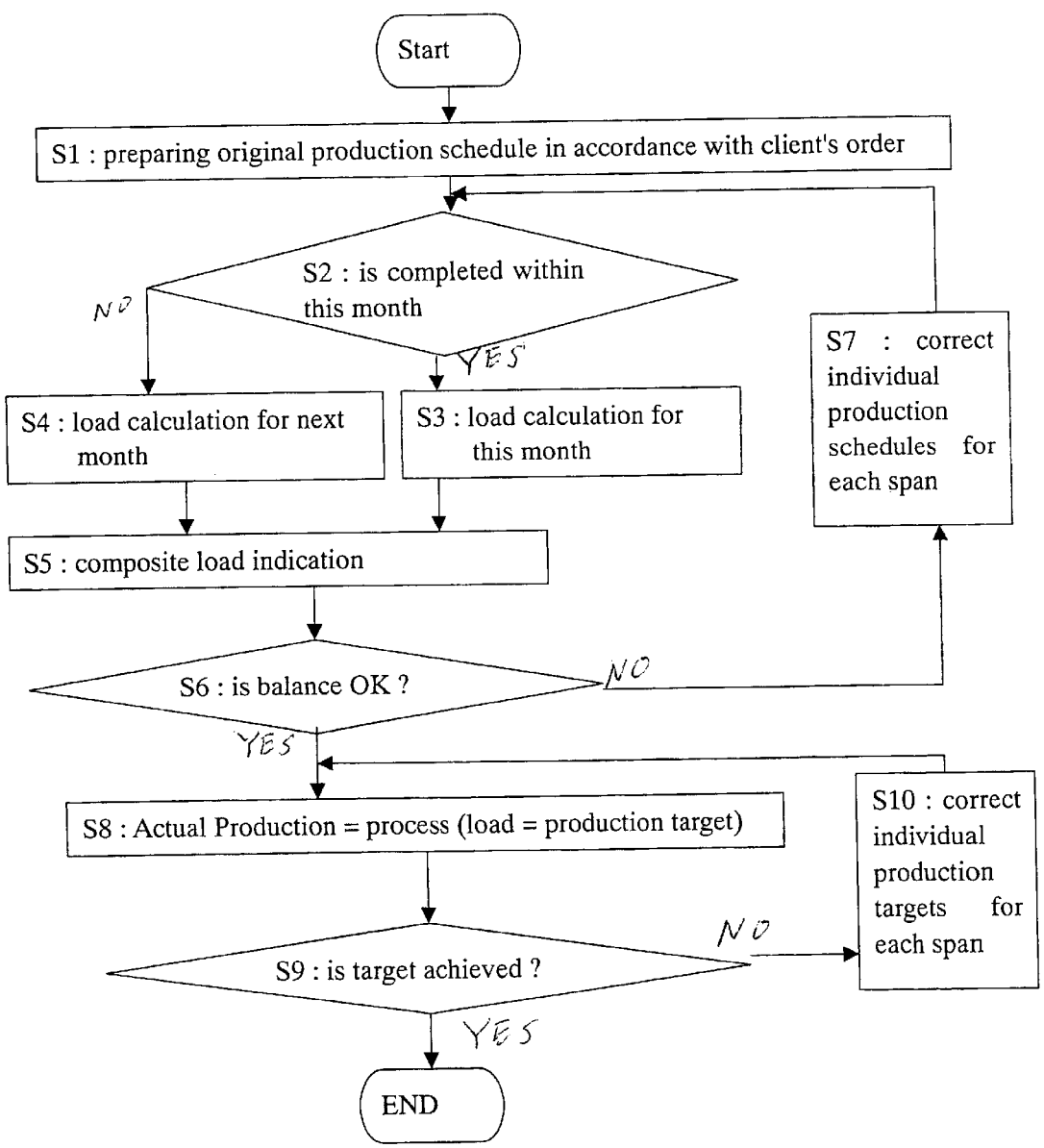
FIG. 12 is a flow chart of sequential processes performed by the novel production management system of FIG. 7.

The operations of the above novel production management system will be described. FIG. 12 is a flow chart of sequential processes performed by the novel production management system of FIG. 7.

In the first step S1, the production schedule is planned in accordance with the client's order. The production schedule comprises a plurality of lots, for example, a lot No. 1 to a lot No. m. Each lot further comprises individual process names, individual equipment names for the individual processes, individual loads to the individual equipments, completion dates by when the production should be completed, individual priorities and names of individual products. For example, the lot No. 1 will be processed as follows. In the first step, an equipment "A" is used with a load of 1 to complete the production by first day of July. In the second step, an equipment "C" is used with a load of 4 to complete the production by first day of July. In the third step, an equipment "D" is used with a load of 3 to complete the production by second day of July. In the last step or two hundred fiftieth step, an equipment "Z" is used with a load of 2 to complete the production by twenty fifth day of July. The lot No. 1 has a production term to start the production on first day of July and complete the production on twenty fifth day of July.

The production schedule is sent to the individual section load calculation section 3 for calculating individual loads to the individual sections on the basis of the production schedule.

In the second step S2, the production schedule partitioning section 3-1 receives the production schedule for partitioning the production schedule on monthly basis or in view of the completion month by when the production should be completed in accordance with the production schedule.

In the third step S3, the this month load calculation section 3-2 calculates the this-month loads which should be completed by this month in accordance with the production schedule.

In the fourth step S4, the next month load calculation section 3-3 also calculates the future month loads which should be completed by the next month.

In the fifth step S5, the calculated this-month load and the future month load are sent to the composite load indication section 3-4 for allowing the composite load indication section 3-4 to calculate the composite load values of the this month load to the next month load.

The load calculations are described in more detail with reference to FIG. 10. The load calculations are made for every lots. As to the lot No. 1, for example, the production start day is first day of July, whilst the production completion day is twenty fifth day of July. In the second step S2, it is recognized that the production for the lot No. 1 should be completed within this month, whereby the data are entered in the load of July. For the first process 1, the completion date is first day of July, whereby data are entered into the column of July. The name of equipment is "A", whereby data are entered into the top row represented by the equipment name "A" July. The completion date is first day of July, whereby the data are entered into the most left column represented by "1."

The final completion date is twenty fifth day, whereby the data are entered into the intermediate row represented by "this month completion load". The load of the first process of this lot No. 1 is counted as the this month completion load.

This lot No. 1 is The first lot, for which reason the intermediate row in the most left column "1" changes "0" into "1". If the next load is entered into the same row and column, this value "1" is replaced by "the sum of 1 and the next load value".

The second process is also entered into any row and column in the same manners as described above whereby the load "4" is entered. The above processes will be repeated to the final process 250 in the first lot No. 1, whereby the load calculation for the lot No. 1 is completed.

For the second or later lots, the loads of the lots which final completion date is first day of August or later are added into the sections of August or later month.

The above calculations will be repeated up to the final lot No. m, the load calculation processes are completed.

FIG. 11 is also illustrative of a result of the re-arrangement of FIG. 10.

In the sixth step S6, the composite load value is sent to the load balancing check section 4 for referring the individual production capacities stored in the production capacity memory 5 for the purpose of comparing the individual production capacities with the individual composite loads so that if there is any load ever the production capacity, then the load balancing check section 4 sends an instruction to correct the production schedule for balancing the loads over the individual equipments or groups.

The production capacity data are fetched and entered into the rows "production capacity per one day" in FIG. 11. The "average load per one day" is compared with the "production capacity per one day". If the "average load per on day" is above the "production capacity per one day", then an alarm appears.

In the seventh step S7, the production schedule correction section 6 corrects the production schedule in accordance with the instruction from the load balancing check section 4, before the corrected production schedule is sent to the individual section load calculation section 3 for subsequent calculation of the individual loads to the individual sections on the basis of the corrected production schedule sent from the production schedule correction section 6, prior to comparison of the individual production capacities with the calculated individual loads.

The loads of the over-load equipments are shifted to be lowered to balance the loads over the equipments so that all of the loads of the all equipments or groups are below the individual production capacities, namely all "average load per one day" are below the individual "production capacity per one day".

In the eighth step S8, if all of the individual loads are below the individual production capacities of the individual equipments or groups, then the individual target indication section 7 indicates the individual loads as the targets to the individual production lines for every section. Namely, the checking of the this month target can be made independently from the checking of the next month target, whereby it is prevented that the productions are biased.

In the ninth step S9, the individual target achievement checking section 8 compares the individual actual production results of the lines to the individual targets for checking whether or not the individual targets are achieved. The production results are informed to the production result data collection and storage section 9 for collecting data about the actual production results of the individual lines and storing the data therein, so as to allow the individual target achievement checking section 8 to compare the individual actual production results of the lines to the individual targets for checking whether or not the individual targets are achieved. The allowable production result range storage section 10 storing individual allowable production results ranges for every section allows the individual target achievement checking section 8 to compare the individual actual production results of the lines to the individual targets for checking whether or not the individual targets are achieved for each month.

The actual production data are continued to be collected until the deadline of the predetermined management span. After the deadline of the predetermined management span, it is checked whether or not the actual production results are within the predetermined allowable production result ranges. If the actual production results are not within the predetermined allowable production result ranges, then the process will enter into the tenth step S10.

In the tenth step S10, if the target could not be achieved, then the individual correction, target calculation section 11 calculates corrected targets for every sections only when any of the production results is beyond the individual allowable production result ranges, whereby the individual correction target calculation section 11 sends the corrected targets to the individual target indication section 7 for the purpose of allowing the individual target achievement checking section 8 to compare the individual actual production results of the lines to the individual corrected targets for checking whether or not the individual corrected targets are achieved.

Figure 13:
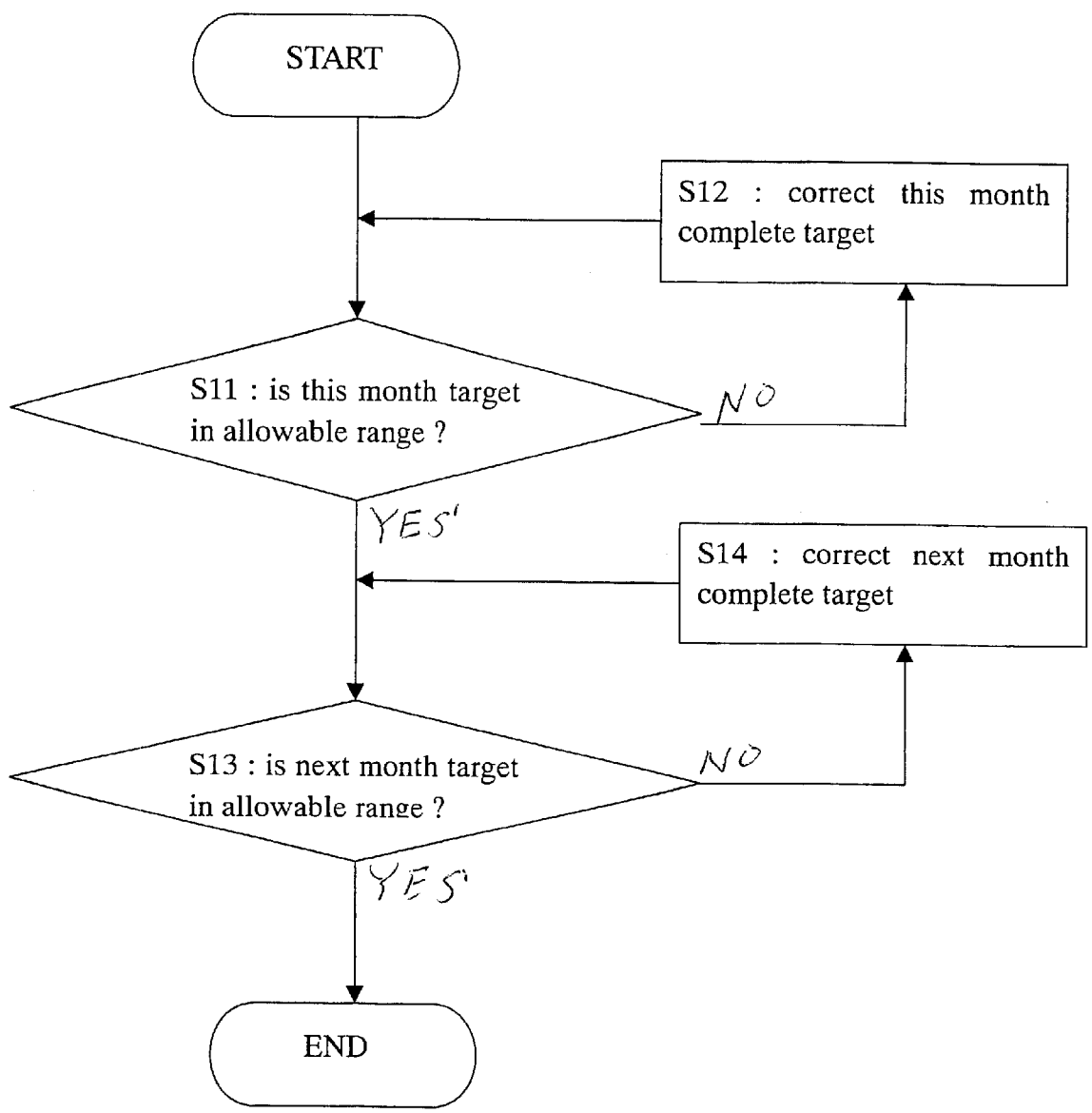
FIG. 13 is a flow chart illustrative of the processes for correction to the target.

The correction to the target is made in consideration of whether the actual production results are over the upper limits of the predetermined allowable production result ranges or under the lower limits thereof. FIG. 13 is a flow chart illustrative of the processes for correction to the target.

In the eleventh step S11, it is confirmed that whether the actual production results are over the upper limits of the predetermined allowable production result ranges or under the lower limits thereof. If the actual producing results are under the lower limits of the predetermined allowable production result ranges, then the target is corrected as follows.

In the twelfth step S12, this-month achievement target is corrected as follows. The number of the unachieved this-month targets which should be corrected for the equipment "C" is found, wherein A: summation of unachieved this-month targets up to this time=100; B; the remaining operable days=10 days; and C: the target throughput=1000 per one day.

The corrected target number=C+A/B=(100 per one day)+100/10 days=1010 per one day.

This corrected target is too high, for which reasons the process should be reduced by changing the plus sign of (A/B) into minus. If it could be confirmed that the actual production results are within the predetermined allowable production result ranges, then the process will enter into the next step.

In the thirteenth step S13, it is confirmed that whether or not the next or later month production results are within the next or later month predetermined allowable production result ranges.

In the fourteenth step S14, the next or later-month achievement target is corrected in the same manner as the twelfth step S12. The allowable ranges may be decided in consideration of various conditions and requirements, for example, in the range of +10%—-0% or +5%—-0%.

The following descriptions will focus on the production line management by the above novel production management system.

Figure 14:
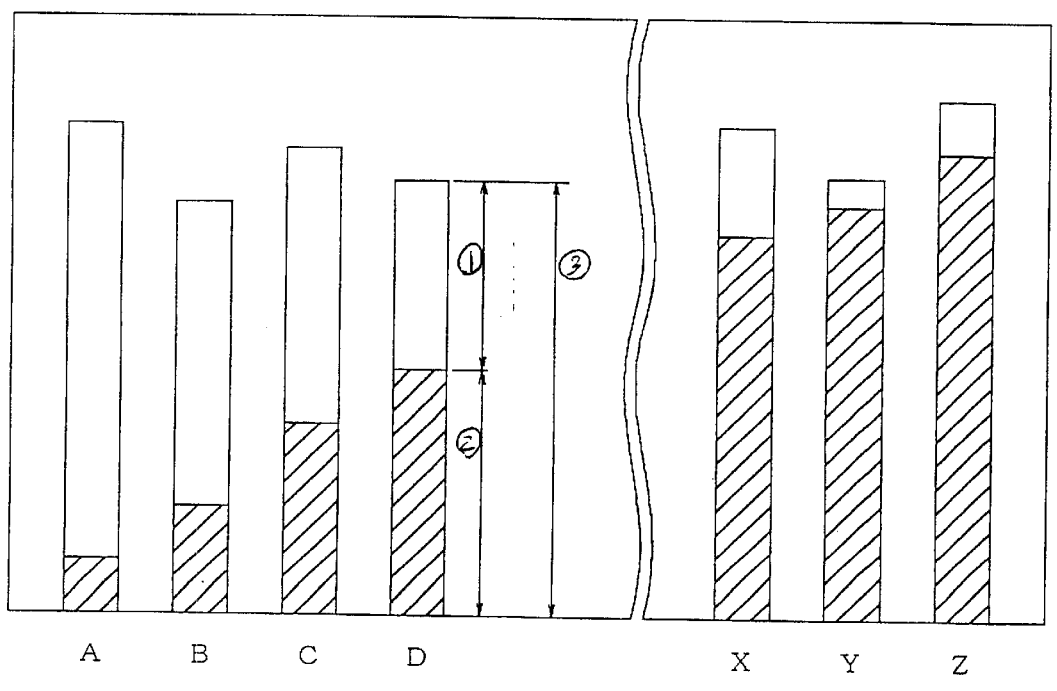
FIG. 14 is a graph illustrative of this month throughput targets and next or later month throughput target in the number of wafers to be processed par one month versus individual equipments "A" through "Z".

FIG. 14 is a graph illustrative of this month targets and next or later month target in the number of wafers to be processed for one month versus individual equipments "A" through "Z", wherein hatched regions represent this month targets, whilst plane regions represent next or later month targets. Even if the total target of the production is achieved, the requirement for deadline of delivery could not be satisfied so long as the this month target could not be achieved. Thus, it is most important to achieve the this month target for the time being. In case, however, the this month process for reducing the next month load might be insufficient for making it difficult to achieve the next month target. In order to avoid this problem, it is also important to achieve the this month target and also to reduce the next month load as many as possible for facilitating the achievement of the next month target.

Figure 15:
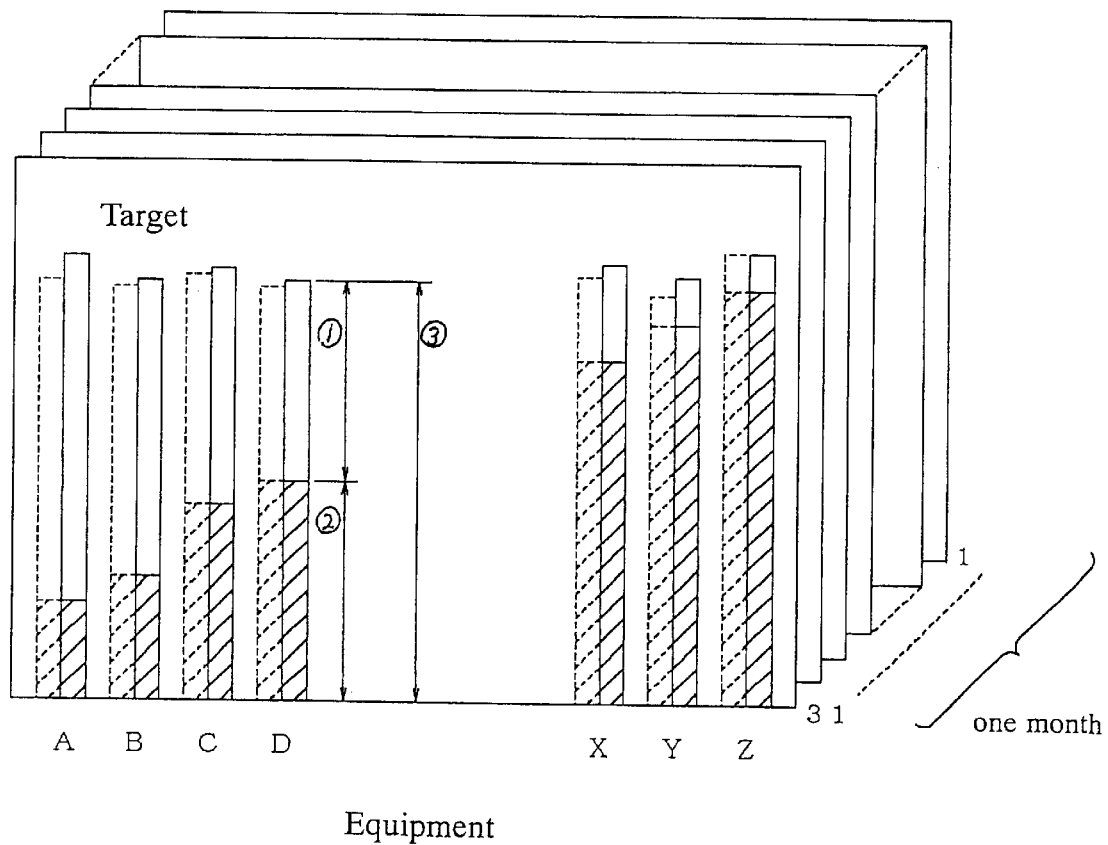
FIG. 15 is a graph illustrative of daily management schedules for achievements to this month targets and next or later month target in the number of wafers to be processed par one month versus individual equipments "A" through "Z".

FIG. 15 is a graph illustrative of daily management schedules for achievements to this month targets and next or later month target in the number of wafers to be processed par one month versus individual equipments "A" through "Z". This graph makes it possible to do daily management and correction to the this month targets and next or later month target on the daily banks.

As a modification to the above present invention, it is possible to use a simulator for correcting the loads and targets.

The above production management method is applicable to not only computer-controlled system but also manually controlled system.

The above FIGS. 14 and 15 are modified by changing the individual equipments "A" through "Z" into the individual processes.

The above present invention provides the following eight effects and advantages.

First, it is possible to process, first of all, lots which should be completed within this month for achieving the this month targets thereby allowing the delivery before the deadline, even those lots have low original priority.

Second, it is possible to prevent that only high priority lots are processed, for which reason it is possible to keep balance of the loads over individual equipments in a manner that could achieve the maximum productivity or could minimize the term for delivery of the products.

Third, it is ensured to achieve every month targets without raising the problems that the individual total targets for individual equipments could be achieved whilst any of this month targets of all the equipments could be not achieved.

Fourth, the requirement for delivery of the products by the deadlines could be satisfied thereby obtaining the client's reliance and an opportunity to receive future good orders from that client.

Fifth, it is possible to suppress the above described first to fourth problems engaged with the conventional system, for which reason it is also possible to countermeasure the problem if raised.

Sixth, there is no need to accelerate the production speed nor requirement for shifting the necessary process for achieving the next month target into the next month process without making it difficult to achieve the next month target.

Seventh, the above fifth and sixth effects are mutually potentiated with each other.

Eighth, any excess processings could be avoid to keep balances of the loads over the equipments.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of load partitioning production management, said method comprising the steps of:
    partitioning loads on production management into at least two time-adjacent predetermined management fixed production time period spans;
    developing at least one computer-produced production schedule based on results of said partitioning step; and
    carrying out at least any one of planning, executing, correcting and managing of the at least one production schedule.

2. The method as claimed in claim 1, wherein after said loads are partitioned, individual load calculations are made for said at least two predetermined management fixed production time period spans.

3. The method as claimed in claim 1, wherein after said loads are partitioned, individual load balancing checks are made for said at least two predetermined management fixed production time period spans.

4. The method as claimed in claim 1, wherein after said loads are partitioned, individual production schedule corrections are made for said at least two predetermined management fixed production time period spans.

5. The method as claimed in claim 1, wherein after said loads are partitioned, individual production target indication process and subsequent production execution and management fixed production time period processes are made for said at least two predetermined management spans.

6. The method as claimed in claim 1, wherein after said loads are partitioned, checking achievements of individual production targets is made for said at least two predetermined management fixed production time period spans.

7. The method as claimed in claim 1, wherein after said loads are partitioned, correcting individual production targets is made for said at least two predetermined management fixed production time period spans.

8. A method of load partitioning production management, said method comprising the steps of:
    partitioning loads on production management into at least two predetermined management fixed production time period spans;
    carrying out individual load calculations for said at least two predetermined management fixed production time period sans developing at least one computer-produced production schedule based on results of said partitioning step; and
    providing at least one management schedule based on results of said carrying out and said partitioning steps.

9. A method of load partitioning production management, said method comprising the steps of:
    partitioning loads on production management into at least two predetermined management fixed production time period spans;
    carrying out individual load balancing checks for said at least two predetermined management fixed production time period spans; and
    providing at least one computer-produced management schedule based on results of said carrying out and said partitioning steps.

10. A method of load partitioning production management, said method comprising the steps of:
    partitioning loads on production management into at least two predetermined management fixed production time period spans;
    carrying out individual production schedule corrections for said at least two predetermined management fixed production time period spans; and
    providing at least one computer-produced management schedule based on results of said carrying out and said partitioning steps.

11. A method of load partitioning production management, said method comprising the steps of:
    partitioning loads on production management into at least two predetermined management fixed production time period spans;
    carrying out individual production target indication processes and subsequent production execution and management processes for said at least two predetermined management fixed production time period spans; and
    providing at least one computer-produced management schedule based on results of said carrying out and said partitioning steps.

12. A method of load partitioning production management, said method comprising the steps of:
    partitioning loads on production management into at least two predetermined management fixed production time period spans;
    checking achievements of individual production targets for said at least two predetermined management fixed production time period spans; and
    providing at least one computer-produced management schedule based on results of said carrying out and said partitioning steps.

13. A method of load partitioning production management, said method comprising the steps of:
    partitioning loads on production management into at least two predetermined management fixed production time period spans;
    correcting individual production targets for said at least two predetermined management fixed production time period spans; and
    providing at least one computer-produced management schedule based on results of said carrying out and said partitioning steps.

14. A system of load partitioning production management, said system comprising:
    means for partitioning loads on production management into at least two predetermined management fixed production time period spans;
    means for carrying out at least any one of planning, executing, correcting and managing of at least one production schedule; and
    providing at least one computer-produced management schedule based on results of said carrying out any said partitioning steps.

15. The system as claimed in claim 14, wherein there is provided means for making individual load calculations for said at least two predetermined management fixed production time period spans after said loads have been partitioned.

16. The system as claimed in claim 14, wherein there is provided means for making individual load balancing checks for said at least two predetermined management fixed production time period spans after said loads have been partitioned.

17. The system as claimed in claim 14, wherein there is provided means for making individual production schedule corrections for said at least two predetermined management fixed production time period spans after said loads have been partitioned.

18. The system as claimed in claim 14, wherein there is provided means for making individual production target indication process and subsequent production execution and management fixed production time period processes for said at least two predetermined management spans after said loads have been partitioned.

19. The system as claimed in claim 14, wherein there is provided means for making checking achievements of individual production targets for said at least two predetermined management fixed production time period spans after said loads have been partitioned.

20. The system as claimed in claim 14, wherein there is provided means for making correcting individual production targets is made for said at least two predetermined management fixed production time period spans after said loads have been partitioned.

21. A system of load partitioning production management, said system comprising:
   means for partitioning loads on production management into at least two time-adjacent predetermined management fixed production time period spans; and
   means for carrying out individual load calculations for said at least two time-adjacent predetermined management fixed production time period spans and providing a computer-generated resultant management schedule.

22. A system of load partitioning production management, said system comprising:
   means for partitioning loads on production management into at least two time-adjacent predetermined management fixed production time period spans; and
   means for carrying out individual load balancing checks for said at least two time-adjacent predetermined management fixed production time period spans and providing a resultant computer-generated management schedule.

23. A system of load partitioning production management, said system comprising:
   means for partitioning loads on production management into at least two time-adjacent predetermined management fixed production time period spans; and
   means for carrying out individual production schedule corrections for said at least two time-adjacent predetermined management fixed production time period spans and providing at least one computer-generated management schedule based on results of said carrying out said partitioning steps.

24. A system of load partitioning production management, said system comprising:
   means for partitioning loads on production management into at least two time-adjacent predetermined management fixed production time period spans; and
   means for carrying out individual production target indication process and subsequent production execution and management processes for said at least two time-adjacent predetermined management fixed production time period spans and providing a computer-generated resultant management schedule.

25. A system of load partitioning production management, said system comprising:
   means for partitioning loads on production management into at least time-adjacent predetermined management fixed production time period spans; and
   means for checking achievements of individual production targets for said at least two time-adjacent predetermined management fixed production time period spans and providing a computer-generated resultant management schedule.

26. A system of load partitioning production management, said system comprising:
   means for partitioning loads on production management into at least two time-adjacent predetermined management fixed production time period spans; and
   means for correcting individual production targets for said at least two time adjacent predetermined management fixed production time period spans and providing a computer-generated resultant management schedule.

* * * * *